(12) United States Patent
Drotos et al.

(10) Patent No.: US 11,244,390 B2
(45) Date of Patent: *Feb. 8, 2022

(54) SYSTEM AND METHOD FOR AUTOMATED COMMUNICATIONS SESSION ROUTING IN A COMMUNICATIONS HANDLING SYSTEM

(71) Applicant: Trans Union LLC, Chicago, IL (US)

(72) Inventors: David Drotos, Russell, OH (US); John Swinford, Chicago, IL (US)

(73) Assignee: TRANS UNION LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,906

(22) Filed: Nov. 18, 2019

(65) Prior Publication Data
US 2020/0265513 A1    Aug. 20, 2020

Related U.S. Application Data

(63) Continuation of application No. 15/141,412, filed on Apr. 28, 2016, now Pat. No. 10,482,531.
(Continued)

(51) Int. Cl.
*G06Q 40/02* (2012.01)
*H04M 3/51* (2006.01)
(Continued)

(52) U.S. Cl.
CPC ...... *G06Q 40/025* (2013.01); *H04M 3/42059* (2013.01); *H04M 3/5166* (2013.01); *H04M 3/5235* (2013.01); *H04M 2203/555* (2013.01)

(58) Field of Classification Search
CPC ............ G06Q 40/025; H04M 3/42059; H04M 3/5166; H04M 3/5235; H04M 2203/555
(Continued)

(56) References Cited

U.S. PATENT DOCUMENTS 7,062,031 B2    6/2006  Becerra et al.
7,136,448 B1 *  11/2006  Venkataperumal .......................... H04M 3/5166
                                                                     379/265.02
(Continued)

OTHER PUBLICATIONS

Marketer's Guide to Qualifying, Routing, and Scoring Inbound Calls to Optimize Sales, DialogTech2015 (15 pages).
(Continued)

*Primary Examiner* — Ahmad F. Matar
*Assistant Examiner* — Jirapon Intavong
(74) *Attorney, Agent, or Firm* — Neal, Gerber & Eisenberg LLP

(57) ABSTRACT

Systems and methods for handling a telecommunications session in real-time are provided, where the telecommunications session is initiated by a calling device and intended for a receiving network. One system comprises a module, in communication with a communications network associated with the telecommunications session, configured for intercepting the telecommunications session prior to reaching the receiving network, obtaining address information associated with the calling device, determining a credit-related score for the telecommunications session based on the address information, identifying an appropriate unit of the receiving network based on the credit-related score, and routing the telecommunications session to the appropriate unit. The system also includes a memory for storing the module and a processor in communication with the memory to execute the module.

20 Claims, 4 Drawing Sheets

Related U.S. Application Data

(60) Provisional application No. 62/154,033, filed on Apr. 28, 2015.

(51) Int. Cl.
  *H04M 3/42* (2006.01)
  *H04M 3/523* (2006.01)

(58) Field of Classification Search
  USPC ........................................ 379/265.13, 265.09
  See application file for complete search history.

(56) References Cited

U.S. PATENT DOCUMENTS

| | | | |
|---|---|---|---|
| 7,814,004 B2 | 10/2010 | Haggerty et al. | |
| 8,488,774 B2 | 7/2013 | Mahalaha et al. | |
| 8,799,150 B2* | 8/2014 | Annappindi | G06Q 40/02 |
| | | | 705/322 |
| 10,482,531 B2 | 11/2019 | Drotos et al. | |
| 2010/0145847 A1* | 6/2010 | Zarikian | G06Q 10/067 |
| | | | 705/38 |
| 2011/0078073 A1 | 3/2011 | Annappindi | |
| 2012/0051537 A1* | 3/2012 | Chishti | H04M 3/5233 |
| | | | 379/265.11 |
| 2012/0294435 A1 | 11/2012 | Cox et al. | |
| 2013/0182835 A1 | 7/2013 | Ma et al. | |
| 2015/0249737 A1* | 9/2015 | Spievak | H04M 3/436 |
| | | | 379/189 |

OTHER PUBLICATIONS

Your Phone Leads Aren't Converting: Steps You Can Take To Fix It, retrieved online from http://www.business2community.com/integrated-marketing/phone-leads-arent-converting-steps-can-take-fix-01052149 on Mar. 12, 2015, (16 pages).
Webpage regarding Predictive Caller Science retrieved online from http://www.intelegence.us/info/ on Dec. 3, 2015, (11 pages).
Korean Intellectual Property Office, International Search Report for International Patent Application No. PCT/US2016/029822 (dated Aug. 9, 2016).
Korean Intellectual Property Office, Written Opinion of The International Searching Authority for International Patent Application No. PCT/US2016/029822 (dated Aug. 9, 2016).
U.S. Appl. No. 15/141,412, filed Apr. 28, 2016.

* cited by examiner

SYSTEM AND METHOD FOR AUTOMATED COMMUNICATIONS SESSION ROUTING IN A COMMUNICATIONS HANDLING SYSTEM

CROSS-REFERENCE TO RELATED PATENT APPLICATIONS

This application is a continuation of U.S. patent application Ser. No. 15/141,412 filed on Apr. 28, 2016, which issues as U.S. Pat. No. 10,482,531 on Nov. 19, 2019, and claims priority to U.S. Provisional Patent Application No. 62/154,033 filed on Apr. 28, 2015, the entire contents of each being incorporated by reference herein.

TECHNICAL FIELD

This invention relates to systems and methods for automated routing and treatment of communications sessions, such as telephone calls, based on criteria associated with the communications sessions.

BACKGROUND OF THE INVENTION

"Phone lead" is a marketing term used to define a business opportunity (or "lead") that comes in the form of an inbound phone call from a potential customer or consumer. Studies show that inbound calls are the most valuable type of lead because they tend to convert to revenue more frequently than, for example, web leads as well as other types of leads. This may be because phone leads tend to come from people who are further along in the decision-making process and therefore, may need only a few questions answered before making a purchasing decision. For such calls, a sale may be best secured by connecting the caller directly to a sales representative or agent.

However, not all calls are placed with the same purpose. In fact, most inbound calls are non-sales calls, such as, for example, misdials or accidental calls, and simple inquiries for store hours, location(s), directions, and other basic information. Also, many inbound calls are from existing customers who are seeking to, for example, review account information, make a payment over the phone, address an issue with the account, or complete other routine tasks. Many businesses, small and large, have found that live receptionists or customer agents are not a cost-effective solution for handling brief, non-sales calls.

One existing solution for filtering or qualifying incoming calls based on sales potential is a "virtual receptionist" or interactive voice response (IVR) system that enables callers to interact with an automated menu using a telephone keypad and/or voice recognition. Based on the inputs received, such systems can guide callers, for example, to self-service options (e.g., for assistance with business hours or account balance inquiries) or to an agent, department, or voicemail box that is appropriate for the caller's inquiry. In some cases, the latter is determined based on the caller's answers to one or more automated questions that are designed to establish information about the caller, such as, for example, the caller's financial situation, the type of products being considered, how serious the caller is about making a purchase, and/or how far along the caller is in the decision-making process (e.g., is the caller still researching, does the caller have a pre-approved loan, what is the caller's budget, etc.).

Thus, existing solutions depend heavily on the caller's inputs to qualify and/or re-route incoming calls. This can lead to erroneous results, particularly if, for example, there are errors in voice recognition, the caller has difficulty understanding the menu options, and/or the caller makes an accidental selection. Further, many callers, especially those with specific questions about a potential purchase or sale, do not appreciate the time or steps required to be qualified by the virtual receptionist system before reaching a live customer agent. In some cases, the system may direct the caller to a generally appropriate group, which may re-direct the caller to one or more agents and/or narrower groups before finally reaching an appropriate sales representative.

These and other drawbacks to existing call handling systems have led some marketers to implement a call scoring process that analyzes and measures the quality of a call after the fact and uses the findings to improve or optimize future marketing techniques. Calls are scored based on, for example, keyword spotting, call duration, agent performance, customer satisfaction, and/or whether the call converted to sales. As such, the findings of the post-call scoring process can help businesses determine how to obtain more high quality phone leads and close more deals in the future. However, the existing call scoring process cannot impact or improve a caller's experience in real-time, as the scoring techniques require a complete set of call data (e.g., from start to finish of a call) to make recommendations.

SUMMARY OF THE INVENTION

The invention is intended to solve the above-noted problems by providing systems and methods for automatically routing a communications session, in real-time, based on aggregated data associated with the communications session. The systems and methods are designed to, among other things: (1) intercept a communications session, such as a telephone call, placed by a calling device to a receiving network; (2) obtain address information that is associated with an origination phone number (or NPA-NXX) of the communications session; (3) retrieve aggregated credit data associated with the address information; and (4) based on the aggregated credit data, route the communications session to an appropriate unit of the receiving network.

For example, embodiments include a system for handling a telecommunications session in real-time, the telecommunications session being initiated by a calling device and intended for a receiving network. The system comprises a module, in communication with a communications network associated with the telecommunications session, configured for intercepting the telecommunications session prior to reaching the receiving network, obtaining address information associated with the calling device, determining a credit-related score for the telecommunications session based on the address information, identifying an appropriate unit of the receiving network based on the credit-related score, and routing the telecommunications session to the appropriate unit. The system also includes a memory for storing the module and a processor in communication with the memory to execute the module.

Another example embodiment includes a computer-implemented method for handling an incoming call, in real-time, the call being placed by a caller to an end-user. The method comprises intercepting the incoming call prior to the call reaching the end user; obtaining, from an address information database, address information associated with an origination phone number for the incoming call; retrieving, from a credit information database, aggregated credit data that is associated with the address information; determining a caller profile for the incoming call based on the aggregated credit data; identifying an appropriate call-answering unit of the end user based on the caller profile; and routing the incoming call to the appropriate call-answering unit.

Another example embodiment includes a system for handling an incoming call placed by a caller to an end user. The system includes a call handling module for intercepting the incoming call prior to the call reaching the end user and determining an aggregated credit score for the incoming call that qualifies the call for at least one of a plurality of call-answering units associated with the end user. The system also includes an address providing module for obtaining address information that is associated with an origination phone number of the incoming call, wherein the call handling module determines the aggregated credit score based on the address information, and based on said score, routes the incoming call to the at least one of the plurality of call-answering units. The system further includes at least one memory for storing the call handling module and the address providing module and at least one processor in communication with the at least one memory to execute the call handling module and the address providing module.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF THE INVENTION

Figure 1:
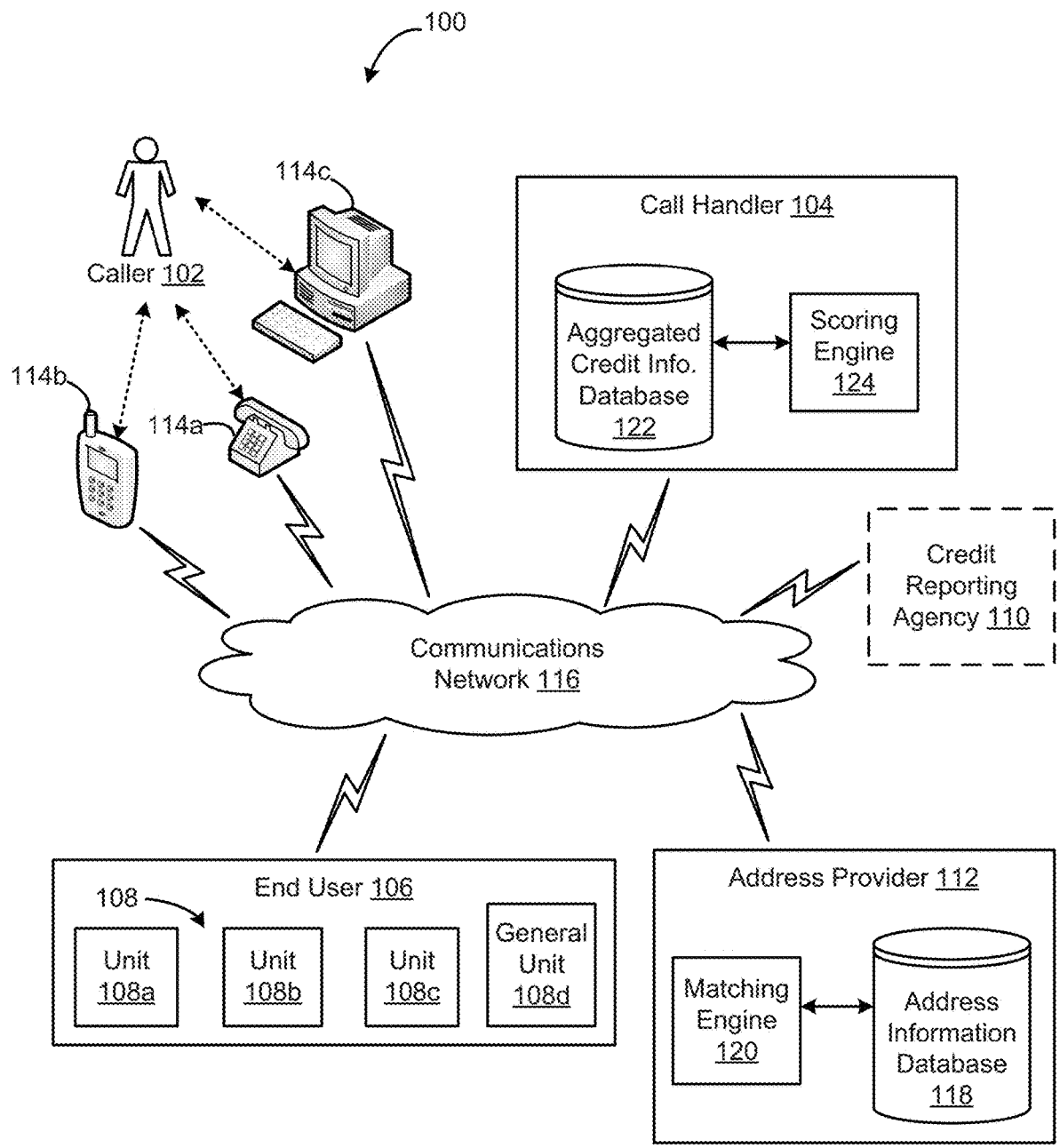
FIG. 1 is a block diagram illustrating an exemplary system for automated call scoring and handling based on aggregated credit data associated with the phone number of a caller in accordance with embodiments.

The description that follows describes, illustrates, and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

It should also be noted that the disclosures made in this specification are in accordance with the principles of the embodiment(s), which are intended to be disclosed or interpreted under their broadest extent under the patent laws, and while such disclosure may describe or otherwise cover subject matter that may be regulated by other existing laws or regulations, including, without limitation, the Fair Credit Reporting Act (FCRA), the Equal Credit Opportunity Act (ECOA), or the Telephone Consumer Protection Act (TCPA), nothing in this disclosure is intended to suggest or imply noncompliance with any such law or regulation by the assignee.

FIG. 1 illustrates a call handling system 100 for real-time scoring and routing of a phone lead, incoming call, or other telecommunications session based on aggregated credit data associated with a micro-geography tied to the phone number of a caller 102, in accordance with one or more embodiments. The system 100 includes a call handler 104 that can be configured to, among other things, (1) intercept, in real-time, calls placed by the caller 102 to an end user 106 of the system 100, or more specifically, a receiving network of the end user 106, (2) automatically score each call based on aggregated credit data associated with the micro-geography tied to the phone number from which the call originates (also referred to herein as "origination phone number"), and (3) based on the resulting score, route each call to an appropriate call-answering group or unit 108 associated with the end user 106 and/or the receiving network of the end user 106

As used herein, the term "micro-geography" refers to a localized geographical area that is defined by at least one type of address information and is at least one address level short of a full address. As will be appreciated, in the United States, a postal address typically includes at least city, state, zip code, and country level information, as well as an additional address level comprising either a P.O. Box number or a house/building/street number and street name. In some cases, the postal address also includes a further address level comprising a unit or apartment number. In addition to the contents of a typical postal address, the term "address information" can include other types or levels of geographical information, including, for example, a ZIP+2 code (e.g., the zip code plus two geography-specific digits), a ZIP+4 code (e.g., the zip code plus two geography-specific digits), a city block, a housing subdivision, etc. To provide a few non-limiting examples, in embodiments, the micro-geography associated with a given phone number may be the geographical area defined by (i) the zip code, ZIP+2, or ZIP+4 code included in address information associated with the phone number, (ii) the apartment building located at the house number included in the address information associated with the phone number, or (iii) the city block that includes the postal address associated with the phone number.

Referring back to FIG. 1, the system 100 may further include a credit reporting agency 110 or other entity that collects credit information and corresponding address information for a plurality of individuals, including the caller 102. For each address provided by the credit reporting agency 110, aggregated credit data can be calculated and/or derived by aggregating the credit information of all individuals associated with a micro-geography that includes the given address. The system 100 also includes an address provider 112 that can perform an address look-up service based on the phone number of the caller 102. Accordingly, the system 100 provides improved call routing techniques that include scoring incoming calls, in real-time, using data that can be automatically obtained based on the phone number associated with the call, thereby requiring minimal inputs from the caller 102 to qualify the call.

Figure 2:
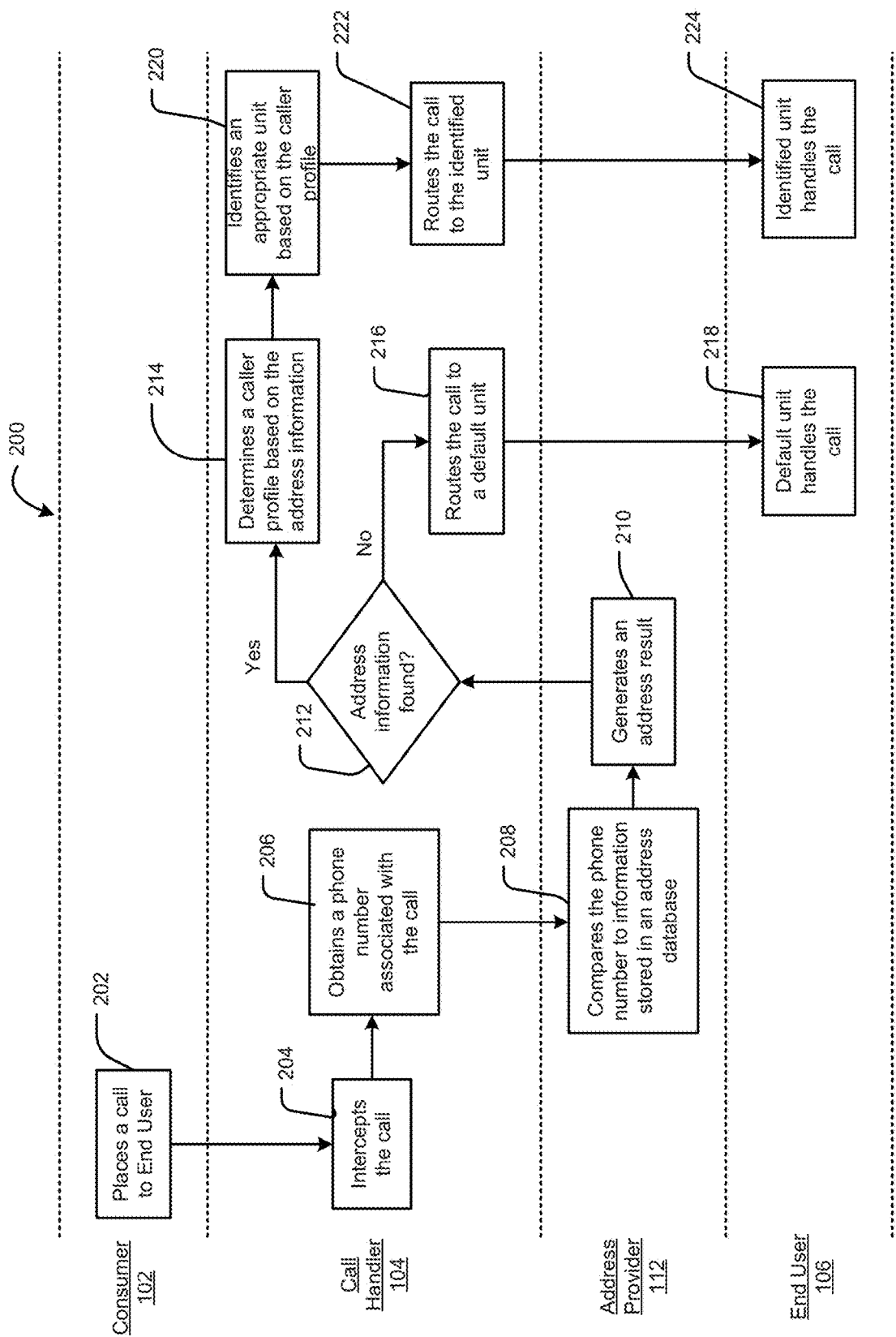
FIG. 2 is a flowchart illustrating example operations of the system of FIG. 1 in accordance with embodiments.
Figure 4:
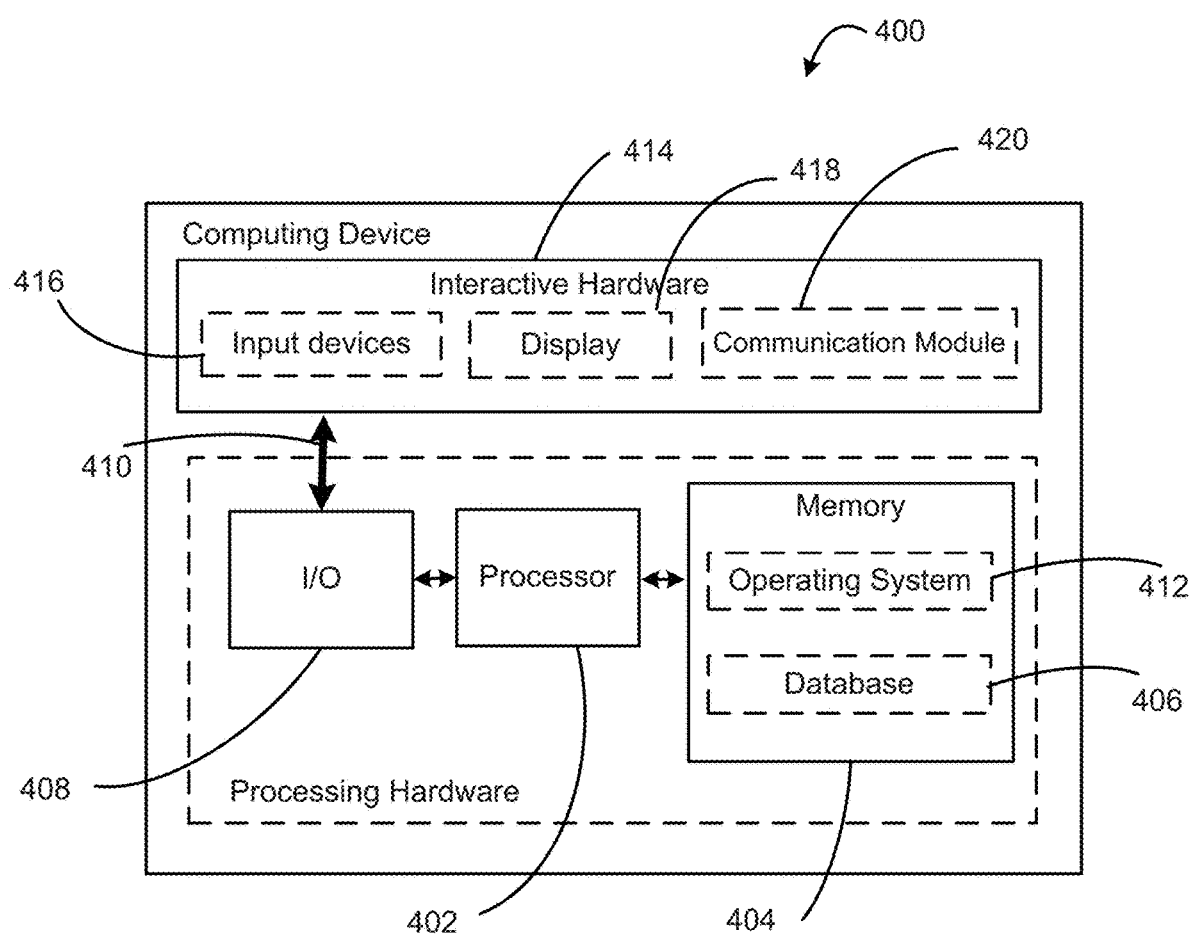
FIG. 4 is a block diagram of one form of a computer or server of FIG. 1, having a memory element with a computer readable medium for implementing the example operations of FIGS. 2 and/or 3 in accordance with embodiments.

Various components of the system 100 may be implemented using software executable by one or more servers or computers, such as a computing device 400 with a processor 402 and a memory 404 as shown in FIG. 4, which is described in more detail below. For example, an embodiment of a process 200 for real-time scoring and routing of an incoming call based on aggregated credit data associated with the address tied to an origination phone number of the caller is shown in FIG. 2, in accordance with one or more principles of the invention. The process 200 may be implemented using the system 100, or more specifically, through interactions between various components of the system 100 that are facilitated by software executing on one or more computer processors (not shown) associated with said components. In the following paragraphs, the process 200 will be described in conjunction with a description of the various components of the system 100.

In FIG. 2, the process 200 may begin at step 202 with the caller 102 placing a call to, or otherwise attempting to communicate with, the end user 106. In embodiments, the caller 102 may be an existing customer of the end user 106, a new customer of the end user 106, a potential or prospective customer of the end user 106, a curious consumer, an accidental dialer, a company or group (e.g., in the case of a "robocall"), or any other entity that places a call to the end user 106. Also in embodiments, the end user 106 can be any type of business or enterprise system that offers to consumers, for sale or consumption, one or more products including goods, services, and/or financial or insurance products. In some cases, at least one of the products may only be offered to consumers that meet one or more qualifications associated with the product, such as, for example, a predetermined marketing profile. In such cases, the score determined by the call handler 104 may be used to determine whether the qualification(s) for a specific product are met. Example end users 106 can include, for example, a financial institution (e.g., bank, credit union, etc.), a credit card company, a cable company, a telephone or mobile carrier, an insurance company, a call center, or any other business that can benefit from qualifying phone leads based on the aggregated credit data associated with the caller's phone number.

Referring back to FIG. 1, calls may be placed by the caller 102 to the end user 106 using any type of communications device 114 (also referred to herein as a "calling device"), such as, for example, a landline telephone 114a for placing calls over a telecommunications network, a cellular phone or voice-enabled mobile device 114b for placing calls over a cellular network, or a computing device 114c for placing calls over a data network (e.g., via a Voice over Internet Protocol (VoIP) connection). As also shown in FIG. 1, the system 100 further includes a communications network 116, which can include one or more separate networks, such as, for example, the telecommunications network (e.g., public switch telephone network (PSTN), etc.), the cellular network (e.g., mobile communications network), the data network (e.g., the Internet), or any other wired or wireless communications network. In embodiments, the call handler 104 communicates with the address provider 112, the credit reporting agency 110, and/or the end user 106 using the communications network 116 in order to carry out various aspects of the process 200.

At step 204 in FIG. 2, the call handler 104 intercepts the call placed by the caller 102 to the end user 106, or a receiving network thereof, via the communications network 116, so that the call handler 104 can make a real-time routing decision before the call reaches the end user 106. Upon making a routing decision, the call handler 104 can route the incoming call to the appropriate group or unit 108 associated with the end user 106 using at least one of the communications network 116, a local telephone exchange (e.g., private branch exchange (PBX), call center, etc.), or a local data network (e.g., an enterprise private network, a corporate computer network, a local area network (LAN), etc.) of the end user 106. According to embodiments, the call handler 104 can be implemented as hardware (e.g., terminals, switches, phone lines, etc.) and/or software (e.g., a routing strategy).

In some embodiments, the call handler 104 can be incorporated into a local exchange carrier (LEC) or wireless carrier that handles the incoming call. In other embodiments, the call handler 104 can be incorporated into an enterprise call center or other third-party entity that handles incoming calls on behalf of the end user 106. For example, the call handler 104 may be incorporated into, or form a part of, an automatic call distributor (ACD) that distributes or routes incoming calls to a specific group of terminals or agents based on customer need, type, agent skill set, etc. In still other embodiments, the call handler 104 can be included in, or hosted by, the end user 106. For example, the call handler 104 may be incorporated into a local call routing system or local call center associated with the end user 106 and may use the private branch exchange of the end user 106 to route calls received from the communications network 116 to the various units 108 of the end user 106. In such cases, the credit reporting agency 110 may still communicate with the call handler 104 via the communications network 116 to provide and/or update the credit information stored in the credit information database 118 of the call handler 104. Also in such embodiments, the address provider 112 may still communicate with the call handler 104 via the communications network 116 to provide address information for a given phone number.

In a preferred embodiment, the call handler 104 interacts with the address provider 112 via the communication network 116 to obtain address information that is associated with the origination phone number of the caller 102. In some cases, the address provider 112 may be provided by, or incorporated into, the local exchange carrier or wireless carrier network associated with the incoming call. In other embodiments, the address provider 112 can be incorporated into the call handler 104 and can communicate therewith over a local communications network.

In either case, as shown in FIG. 1, the address provider 112 hosts and/or stores an address information database 118 that includes address information for a plurality of persons, businesses, and/or other entities. The address information for each entity may include a house/building/street number, direction, street name, unit number, city/town, state, zip code, ZIP+2, ZIP+4, and/or other geographical information associated with the entity. In some embodiments, the address information for each entity only includes information pertaining to the one or more of micro-geographies encompassing the address of the entity. In a preferred embodiment, within the address information database 118, each entity's address information (or preselected micro-geography) may be linked to, or associated with, one or more phone numbers (including, e.g., NPA-NXX) for that address and/or entity. In some embodiments, the address provider 112 may include or utilize a home location register (HLR) and/or data exchanged over a signaling system number 7 (SS7) network to obtain the address information associated with an incoming mobile or cellular call.

As illustrated in FIG. 1, the address provider 112 further includes a matching engine 120 that is in communication with the address information database 118 and is configured to match a received phone number to corresponding address information stored in the address information database 118. Thus, using the matching engine 120 and the address information database 118, the address provider 112 can obtain, or look-up, address information for any caller 102 calling from a phone number included in the address information database 118.

In other embodiments, instead of, or in addition to, a phone number, other numbers or indicia associated with the communications device 114 (e.g., mobile phone) or the caller 102 may be used to obtain or determine an address associated with the caller 102, including, for example, a media access control (MAC) address or Internet Protocol (IP) address associated with the computing device 114c, a mobile directory number, subscriber or local routing number (LRN), mobile identification number (MIN), and/or location/presence information associated with the mobile communications device 114b, or other device addresses, numbers, or information.

Referring back to FIG. 2, upon intercepting the call at step 204, the call handler 104 determines the origination phone number associated with the incoming call at step 206 of the process 200. In a preferred embodiment, the call handler 104 determines a phone number associated with an incoming call using an automatic number identification ("ANI") service, or other similar service for automatically determining the origination telephone number of an incoming call (a.k.a. a reverse lookup service). In some embodiments, the call handler 104 may directly provide the ANI service for determining the origination phone number (e.g., where the call handler 104 is incorporated into the LEC or wireless carrier). In other embodiments, the call handler 104 may request and/or receive ANI information for a given incoming call from a third-party entity associated with the communications network 116 (e.g., local exchange carrier, wireless carrier, etc.). Alternatively, the ANI service may be provided by the address provider 112, in which case the address provider 112 performs the step 206. In still other embodiments, the origination phone number may be provided to the call handler 104 through a caller identification (CID) service or the like.

In embodiments, once the origination phone number is determined at step 206, the call handler 104 provides the number to the address provider 112 to obtain corresponding address information. In particular, at step 208, the matching engine 120 of the address provider 112 compares the origination phone number to address information stored in the address database 118. At step 210, the matching engine 120 generates an address result based on the comparison from step 208, and the address provider 112 sends this result to the call handler 104. If the matching engine 120 finds that the address database 118 includes address information for the origination phone number, the address result includes the corresponding address information. If the matching engine 120 does not find address information for the origination phone number in the address database 118, the address result includes an indication that address information is not available in the address database 118.

At step 212, the call handler 104 analyzes the received address result to determine whether address information has been found. If the address result includes address information, the process 200 continues to step 214 to score the incoming call, and ultimately route the call to an appropriate business unit 108 of the end user 106, as described in more detail herein. If the address result does not include address information, the process 200 continues to step 216, where the incoming call is routed to a default unit 108d, shown in FIG. 1.

Studies have shown that the origination number of most incoming calls can be identified through the ANI service. Thus, for most incoming calls, address information may be obtained at step 208 and based thereon, the process 200 can continue to step 214 and beyond to score and route the calls accordingly, as described in more detail herein. For the remaining incoming calls, since the origination phone numbers cannot be determined, corresponding address information may not be ascertained. Thus, at step 216, these unmatched calls may be routed to the default unit 108d of the end user 106, which then handles the call, at step 218, according to standard call processing procedures. For example, routing the call to the default unit 108d may place the call into a general call-answering queue, send the call to a designated voicemail box, or forward the call to an automated receptionist line.

In a preferred embodiment, referring back to step 210, the address provider 112 may be configured to return only the zip, ZIP+2, or ZIP+4 code included in the address information for the origination phone number. As used herein, the terms "ZIP+2 code" and "ZIP+4 code" include the basic five-digit zip code for a given address along with an additional two- or four-digit code, respectively, that identifies a geographic segment within the delivery area represented by the five-digit zip code. For example, the additional two- or four-digit code can pinpoint a city block, a group of apartments, an individual high-volume receiver of mail, a post office box, or any other delivery point, as needed to provide efficient mail sorting and delivery. By including only the zip, ZIP+2, or ZIP+4 code in the address result returned to the call handler 104, the system 100 maintains depersonalization of the caller 102's information and adheres to relevant regulatory requirements. Also, by limiting the address information to a predefined micro-geography, the system 100 can reduce the real-time processing delay associated with scoring incoming calls before routing the calls to an appropriate end user 106, in accordance with the principles and techniques described herein.

According to embodiments, the address information received from the address provider 112 can be used to locate corresponding aggregated credit information for the caller 102, or more specifically, aggregated credit data associated with a micro-geography tied to the caller 102. As shown in FIG. 1, the call handler 104 hosts or stores an aggregated credit information database 122 that stores depersonalized, summary level credit information for the owners, residents, and/or other individuals associated with each of a plurality of micro-geographies. Further, the call handler 104 includes a scoring engine 124 that uses the received address information to retrieve corresponding aggregated credit information from the aggregated credit information database 122.

Generally speaking, each individual associated with an address has a plurality of individual credit-related attributes that is collected, stored, and/or provided by the credit reporting agency 110, or other similar entity. To comply with federal regulations regarding how such credit-related data can be used, the individual attributes associated with a given address, or other geographical location, can be depersonalized and combined to generate aggregated credit data comprising a set of aggregated credit-related attributes for a corresponding micro-geography or other localized geographical area. The depersonalization process ensures that the aggregated credit data will not include identifying information of the individuals residing at the given address, in compliance with the Federal Credit Reporting Act (FCRA). In a preferred embodiment, the credit information stored in the credit information database 122 includes credit-related data aggregated according to ZIP+4 codes. For example, the individual credit-related attributes for all individuals living at, or associated with, the ZIP+4 code included in the caller 102's address information may be aggregated to create a set of aggregated credit-related attributes for the micro-geography defined by that ZIP+4 code. Other forms of aggregation may be utilized in accordance with the principles described herein, including, for example, based on zip code, neighborhood, sub-division, street block, or any other geographical boundary.

More specifically, in embodiments, the aggregated credit data for each address stored in the aggregated credit information database 122 may include one or more aggregated credit-related attributes, each aggregated attribute representing a collection of individual credit-related attributes for the individuals associated with that address. For each individual, the individual credit-related attributes may include a credit score of the individual, prior insurance shopping by the individual, the length of time the individual has resided at their current address, a number, type, and standing of credit accounts currently owned by the individual (e.g., revolving credit account), a number of authorized user trade lines associated with each credit account, a number of overdue credit lines, a number, type, and standing of credit accounts previously own by the individual (e.g., closed accounts), an age of the individual, lending data associated with the individual (e.g., for past and present loans), a late payment status for each credit, loan, or other account by category, etc.

In embodiments, the individual's credit score may be calculated and/or derived from the other credit-related attributes associated with that individual, and may be a numerical approximation of the overall credit or insurance-related risk associated with the individual. In some cases, the individual's credit score is calculated using a formula determined by the credit reporting agency 110 or other entity that collects and/or provides the individual credit-related attributes to the call handler 104. In other cases, the end user 106 may provide the call handler 104 with an aggregated credit data roster and the call handler 104 may develop a marketing model or segmentation system internally in accordance with said roster. In still other cases, the end user 106 may provide a proprietary formula that defines how the scoring engine 124 calculates the individual credit scores and/or which credit-related attributes are considered or aggregated to develop the score.

In a preferred embodiment, the aggregated credit-related attributes may be periodically (e.g., quarterly, monthly, weekly, etc.) calculated based on the latest credit-related attributes for the plurality of individuals associated with a given micro-geography and stored in the aggregated credit information database 122 until the next period. In other embodiments, the aggregated credit-related attributes for the individuals associated with a given micro-geography can be calculated on a real-time basis, i.e., once a call has been received.

When generating the aggregated credit data, the individual credit-related attributes may be grouped together by category in order to create the aggregated attribute. How each set of attributes is aggregated can depend, at least in part, on the type of data included in the attribute. For example, if there are ten people living at a micro-geography, such as a zip code, the aggregated credit score for that area may be an average of the ten people's individual credit scores, while the aggregated number of accounts may be a total number of accounts owned by the ten people. In some embodiments, aggregation calculation and/or derivation may further depend on a set of business rules provided by the end user 106 and/or the call handler 104. In a preferred embodiment, the micro-geography used to generate the aggregated credit data will never be at a geographic or address level lower than the address information provided to the call handler 104 by the address provider 112.

In some embodiments, the aggregated credit data may include, for example and without limitation, a categorization and count of the individuals residing at a zip code, a ZIP+4, or other predetermined geographical location, average and median credit scores of those individuals, categorization and counts of individuals at different risk levels, calculation of the average age of the individuals, categorization and counts of individuals by length of time residing at the micro-geography, and/or other types of aggregated credit-related attributes. The different risk levels for the categorization and counts of the individuals may include several risk levels that are based on the credit scores of the individuals. For example, the risk levels may be based on various predefined ranges of credit scores. Similarly, the different age levels for the categorization and counts of the individuals may include several age levels that are based on the ages of the individuals. For example, the age levels may each be predefined by a particular age range.

Likewise, the categorization of individuals by length of time resided at the address may include several retention levels that are based on the residence duration of the individuals at the address. For example, the retention levels may each be predefined by a different duration, e.g., less than 12 months, 12 months or greater, 24 months or greater, and 36 months or greater. Such retention data may be helpful in measuring the stability of a given address, or more specifically, the individuals residing therein. This stability information can indicate the risk level of the individuals residing at that location. For example, a high stability may indicate individuals that are more responsible and have lower loss potential, while a lower stability may indicate individuals that are transient and have a higher loss potential.

In embodiments, the aggregated credit information database 122 receives pre-aggregated credit-related attributes for a plurality of predetermined locations or addresses from the credit reporting agency 110 or other entity that collects and stores the credit-related attributes of individuals. For example, the credit reporting agency 110 may perform the calculation and/or derivation of the aggregated credit attributes prior to sending the aggregated credit data to the aggregated credit information database 122 for storage therein. In such cases, the database 122 does not contain individual credit information. Upon receiving address information (e.g., ZIP+4 code) from the address provider 112, the scoring engine 124 may compare the received address to address information stored in the aggregated credit information database 122, and if a match is made, retrieve the aggregated credit attributes that are associated with the matching address information from the aggregated credit information database 122.

In other embodiments, the database 122 may store individual credit-related attributes, and the scoring engine 124 may calculate and/or derive the aggregated credit attributes for a given address (e.g., ZIP+4 code). For example, if the received address information includes the ZIP+4 code associated with the incoming call, the scoring engine 124 may access the database 122 to identify the individuals that are associated with or reside at the received ZIP+4 code, retrieve the individual credit-related attributes for the identified individuals from the database 122, and then aggregate the retrieved individual credit-related attributes to create aggregated credit data for the ZIP+4 code associated with the incoming call. The aggregated credit data may then be used by the call handler 104 to score and route the call.

Referring back to FIG. 2, at step 214, the call handler 104 determines a caller profile, or score, for the incoming call based on aggregated credit information associated with the address information received from the address provider 112. In some embodiments, based on the corresponding aggregated credit data, the scoring engine 124 can generate the caller profile (also referred to as a risk profile, a credit profile, or marketing profile) or other credit-related score for qualifying the incoming call. For example, the scoring engine 124 may be configured to develop models or set criteria for a given micro-geography to determine which attributes to use for generating the caller profile. In embodiments, the composition and/or derivation of the caller profile can be defined by the call handler 104, the end user 106, or the credit reporting agency 110, and can be based on any combination of the aggregated credit-related attributes, including, for example, risk levels, credit scores, insurance shopping, age, stability information, credit card account information, bankruptcy information, lending data, etc. In other embodiments, the caller profiles are previously generated based on information provided by the credit reporting agency 110, or other entity (e.g., prior to receiving the call) and provided to the call handler 104 for storage in the aggregated credit information database 122 in association with the corresponding address information. In such embodiments, at step 214, the scoring engine 124 accesses the aggregated credit information database 122 to retrieve the predetermined caller profile that corresponds to the address information received at step 212.

In some embodiments, the caller profile can be a calculated metric or score, such as the predetermined aggregated credit score or a customized score that is generated based on a formula provided by the end user 106 and/or the call handler 104. In other cases, the caller profile can be a collection of credit-related attributes that are selected based on a model provided by, or a set of call qualifying needs of, the end user 106. For example, if the end user 106 wants to target consumers looking for auto insurance, the caller profile may include aggregated credit-related attributes that are indicative of whether or not the consumer will need that coverage (such as, e.g., residing in an area with high shopping activity, having a lower credit score, etc.). As another example, if the end user 106 wants to target consumers who resemble their best customers, the caller profile may include the attributes that resemble or define their best customers, such as, for example, certain insurance scores, and any other credit-related attributes that may be indicative of a best customer. In some cases, the caller profile may include a list of aggregated credit-related attributes and a value for each attribute that is specified by the end user 106 based on the end user's target market (such as, for example and without limitation, no bankruptcies in the last seven years, less than five open credit accounts, less experienced credit users with low derogatory history, less than four authorized user trade lines, no overdue credit line, no late payments in the last two years, primary account holders, etc.).

In some embodiments, the process 200 further includes determining or identifying other or additional caller information associated with the incoming call. For example, the additional caller information may include a geography associated with the origination phone number (e.g., country, region, city, state, etc.), the day of the week and/or time of day that the incoming call is received, a channel or digital advertising medium that drove the caller to place the incoming call (e.g., an online search engine, an online banner or other advertisement displayed on a webpage, a directly-dialed telephone call (for example, where the caller places the call after seeing the phone number online), etc.), and/or an originating advertisement, or advertising campaign, that prompted or led to receipt of the incoming call. In embodiments, one or more pieces of the additional caller information may be used in conjunction with the aggregated credit data to determine the caller profile (e.g., at step 214) and/or route the call to an appropriate unit 108 (e.g., at step 220). For example, a combination of the aggregated credit data, the geographical location of the caller, and an identity of the originating advertisement may be used to generate a marketing score for the incoming call, and each unit 108 may be assigned a different range of marketing scores. As another example, the units 108 may be assigned to select originating advertisements and/or geographical locations, and further assigned to specific aggregated credit scores. In such cases, the incoming call may be routed to an appropriate unit 108 based on all three pieces of information: aggregated credit data, the geographical location of the caller, and an identity of the originating advertisement.

Referring again to FIG. 2, at step 220, based on the caller profile assigned to the incoming call, the scoring engine 124 can identify which call-answering unit 108 of the end user 106, or a receiving network associated therewith, is most appropriate for handling the incoming call. As illustrated in FIG. 1, the end user 106 can include, or be associated with, the plurality of units 108, which include one or more specialized units 108a, 108b, 108c and the general or default unit 108d. In embodiments, the plurality of units 108 can comprise one or more business units, individual sales agents or groups of agents, customer service representatives or departments, receptionists, carrier call centers, telecommunications hardware, software executed by a communications device, and/or any other entity or device that is associated with answering calls on behalf of the end user 106 and makes up the receiving network of the end user 106. In some cases, the units 108 may be communicatively coupled to each other via a private branch exchange (not shown) located at the end user 106's facilities, via a local exchange carrier or wireless carrier (not shown) that uses the communications network 116 to facilitate said communication, and/or via a call center that serves as a central point of contact for the end user 106.

In some embodiments, each of the specialized units 108a, 108b, 108c may be a call-answering entity assigned to handle a specific category or group relevant to the end user 106's business. For example, the units 108a, 108b, 108c may be assigned to respective products (e.g., high-interest loans vs. low-interest loans, auto insurance vs. property insurance, etc.), business units (e.g., home mortgages, business loans, or private wealth management), risk profile types (e.g., high risk, medium risk, or low risk consumers), marketing profiles types (e.g., best customers, emerging markets, etc.), account or customer types (e.g., existing, new, preferred, or potential accounts/customers, primary account holders vs. secondary account holders, etc.), call types (e.g., basic inquiries, account inquiries, or new customer inquiries), or any combination thereof. In other embodiments, the specialized units 108a, 108b, 108c may be different agents, or groups of agents, that are distinguished based on sales performance, availability, location, or any other relevant factor.

The default unit 108d can be a central or generalized business group of the end user 106, a main customer service center associated with the end user 106, a central receptionist line or unit of the end user 106, an automated or virtual receptionist line associated with the end user 106, or any other entity that can serve as a default point of contact, and in some cases, handle general or basic inquiries for the end user 106.

In some cases, the units 108 can comprise a combination of different types of call-answering entities (such as, e.g., sales groups, business units, customer service representatives, telecommunications hardware and/or software, call centers, and/or receptionist). For example, in some cases, the unit 108a may be a group of customer service representatives for handling inquiries regarding existing accounts, the unit 108b may be a sales group for handling prospective clients, the unit 108c may be a business unit for handling new loan inquiries, and the default unit 108d may be a virtual receptionist line. In other cases, the units 108 can comprise the same type of entity. For example, all of the units 108 may be sales groups, with units 108a, 108b, 108c respectively handling "high credit tier," "medium credit tier," and "low credit tier" consumers, and unit 108d handling consumers whose caller profile or marketing score cannot be determined. As will be appreciated, the exact number and type of units 108 can vary depending on the complexity of the end user's business, the number and type of units 108 set up by the end user 106, a call handling capacity of the call handler 104, and/or a number of other related reasons.

In embodiments, the call handler 104 and/or the end user 106 may define a model or a set of rules (also referred to as a "routing strategy") for identifying the appropriate unit 108 that is based on the business needs of the end user 106, the call handling capacities of the call handler 104, a geography of the units 108, and/or other related criteria. For example, the rules may be configured to, based on the caller profile, (i) determine if the caller belongs to a target market group, and if so, route the caller to a specific marketing or product unit (e.g., to pitch certain products to target consumers) or to certain sales representatives (e.g., top performing agents), (ii) select the level of customer service that is offered to the caller (e.g., live agent for preferred customers, automated receptionist line for other customers, etc.), (iii) send the call to the marketing, product, or business group that will most effectively handle the call (e.g., private wealth management versus general banking, etc.), (iv) determine whether the caller is a desired customer and if so, offer a higher level of customer service (e.g., live agent, top performing sales agent), (v) prioritize calls based on whether the caller has a desired caller profile (e.g., move the call ahead in call-answering queue), (vi) select the unit 108 that is geographically appropriate for handling the incoming call (e.g., based on region-specific licenses, approvals, or other qualifications held by the agent(s) at the unit 108), and/or (vii) send the call to the agent or unit 108 that specializes in the product mentioned in the originating advertisement that prompted the incoming call.

In embodiments, the rules may specify a composition of the caller profiles by identifying one or more aggregated credit-related attributes that should be included in each caller profile and the value of each included attribute that is required to qualify for a given unit 108. For example, the rules may require each caller profile to include the aggregated credit score associated with the origination phone number of the incoming call and may assign a different range of aggregated credit scores, or marketing scores, to each of the specialized units 108a, 108b, 108c. Based on these rules, the call handler 104 can identify the appropriate units 108a, 108b, or 108c by determining which of the units has a range encompassing the aggregated credit score of the incoming call. More specifically, calls with an aggregated credit score that falls within a lower performing range (e.g., 400-500) may qualify for the unit 108 handling low performing consumers, calls with an aggregated credit score that falls within a high performing range (e.g., 700-800) may qualify for the unit 108 for handling high performing consumers, and so on.

In some cases, the rules may be based on the makeup of the specialized units 108a, 108b, 108c. In particular, if the specialized units 108a, 108b, and 108c are assigned to respective products (e.g., high-interest loans, low-interest loans, preferred auto insurance, standard auto insurance, etc.), the caller profile may be configured to include one or more aggregated credit-related attributes or models that are related to at least one of the products, or tend to indicate which of the products may be of more interest to the caller. Further, the rules may assign a different qualifying value, or range of values, for each of the attributes to each of the units 108a, 108b, 108c. For example, a call may qualify for the non-standard insurance (e.g., unit 108a) if the caller profile includes a marketing score, built on the aggregated credit score associated with the caller, that falls into a lower tier. As another non-limiting example, a call may qualify for a low interest loan unit (e.g., unit 108b) if the caller profile includes a bankruptcy attribute with a value of zero, a number of revolving credit accounts attribute with a value of less than five, and/or a number of overdue credit lines attribute with a value of zero. In some cases, the rules may be tailored to identify a targeted or preferred set of consumers and/or a less than desirable set of consumers, for example, by configuring the caller profile to include credit-related attributes, and/or values therefor, that are indicative of a highly preferred consumer and/or a less preferred consumer.

In some cases, the call handler 104 may not have sufficient information to make a determination at step 214 or an identification at step 220. For example, the aggregated credit information database 122 may not include sufficient aggregated credit data for the micro-geography associated with the incoming call to generate the caller profile. In embodiments, when the caller profile is incomplete or nonexistent, the call handler 104 may identify the default unit 108d as the most appropriate unit 108 for handling the call at step 220.

Once an appropriate one of the units 108 is identified at step 220, the call handler 222 routes the call to the identified unit 108 at step 222, and at step 224, the identified unit 108 handles the call on behalf of the end user 106.

In an alternative embodiment, the system 100 may not include the address provider 112, and the call handler 104 may obtain credit information for an incoming call based on the origination phone number itself. For example, the aggregated credit information database 122 may be configured to store credit information in association with a plurality of phone numbers. In such cases, to maintain depersonalization, a given phone number may be previously linked to a corresponding ZIP+4 code, or other generalized address information, and aggregated credit data for said generalized address information may be previously generated and stored in the database 122 in association with the phone number.

Figure 3:
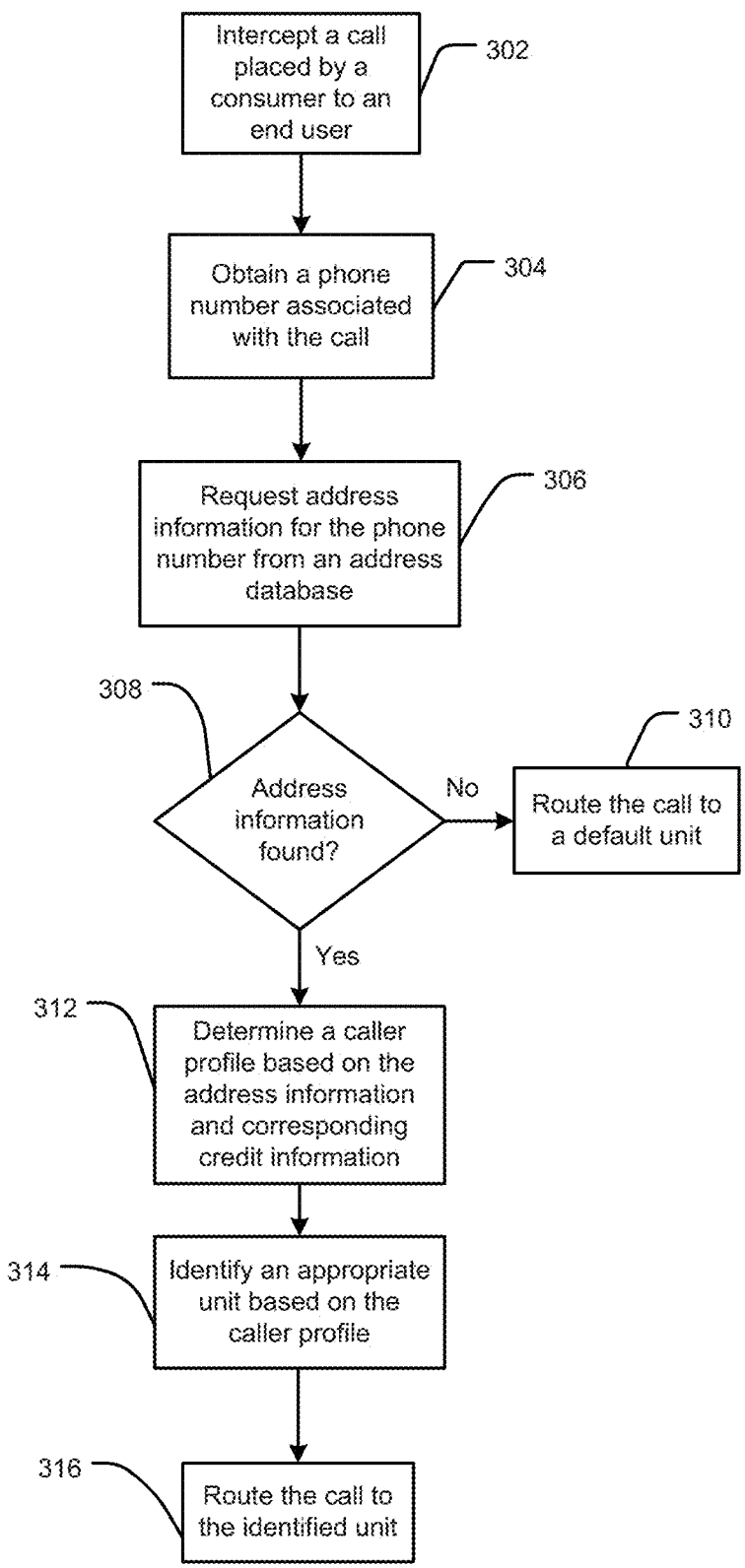
FIG. 3 is a flowchart illustrating example operations of the call handler of FIG. 1 in accordance with embodiments.

FIG. 3 illustrates an embodiment of a process 300 for real-time scoring and routing of a phone lead based on aggregated credit data associated with an origination phone number of the caller, in accordance with one or more embodiments. As an example, the process 300 may be carried out by the call handler 104, or any other entity that can score and route calls placed by a caller to a business entity, using software stored on a computer readable medium and executing on one or more computer processors (not shown) associated with the call handler or other entity. The call handler may interact with one or more components of the system 100 to carry out the operations of the process 300.

The process 300 may begin a step 302, where the call handler intercepts a call placed by a user (e.g., the caller 102) to a business entity (e.g., the end user 106) via a communications network (e.g., the network 116). At step 304, the call handler obtains an origination phone number associated with the incoming call. As an example, the call handler may use an ANI service provided by the local exchange carrier, the wireless carrier, or another third-party entity to obtain the origination phone number.

At step 306, the call handler requests address information for the origination phone number from an address information database (e.g., the address database 118). As an example, the call handler may send the origination phone number to an entity (e.g., the address provider 112) that maintains the address information database. Said entity may compare the phone number to information stored in the address information database to determine whether address information for the phone number is present in the database. The result of this address lookup may be sent back to the call handler. At step 308, the call handler determines whether address information has been found for the origination phone number. If an address was not found in the address information database, the process 300 continues to step 310, where the call is routed to a default unit (e.g., the default unit 108d) of the business entity. As an example, the default unit or line may be an automated or virtual receptionist line, a general customer service line, a central receptionist, or any other group, individual, phone line, or other entity that can serve as a default point of contact for the business entity.

If the address lookup result includes address information for the phone number, the process 300 continues to step 312. In a preferred embodiment, the received address information includes a zip code, ZIP+4 code, or other depersonalized or generalized address information. At step 312, the call handler determines a caller profile, or score, for the incoming call based on credit information that is associated with the address information received at step 308. More specifically, the call handler may compare the received address information to a credit information database (e.g., the aggregated credit information database 122), which stores aggregated credit information for a plurality of individuals and/or addresses. In embodiments, the credit information may include aggregated credit data that is a combination of the individual credit-related attributes for all individuals residing at, or associated with, a zip code, ZIP+4 code, or other micro-geography location.

The call handler may include the aggregated credit information database and a scoring engine (e.g., the scoring engine 124) for retrieving the credit information associated with the received address information from the credit information database. Using the retrieved credit information, the call handler, or more specifically, the scoring engine, may determine a caller profile for the incoming call according to criteria provided by the business entity and/or the call handler 104. In some cases, the caller profile is a predetermined aggregated credit score included in the aggregated credit data. In some cases, the caller profile is a customized score that is calculated and/or derived based on various attributes of the aggregated credit data and using a proprietary formula provided by the business entity or the call handler. In other cases, the caller profile includes a pre-specified set of credit-related attributes that are included in the aggregated credit data.

At step 314, based on the caller profile determined at step 312, the call handler 104 determines or identifies which of a plurality of business units (e.g., the plurality of units 108a, 108b, 108c, and 108d) would be most appropriate for handling the incoming call. The business units may include marketing, business, or product groups, customer service agents or sales representatives, automated or virtual receptionist lines, and the like. The call handler 104 may make the business unit determination based on a model or a set of rules provided by the business entity and/or the call handler for triaging incoming calls based on the caller profile for each call. As an example, the rules may direct the call handler to route calls with certain aggregated credit scores, or marketing models built from the aggregated credit data, to a specified business unit (e.g., calls with higher scores may be directed to a preferred business unit, and so on). As another example, the rules may direct the call handler to route calls with certain attribute values to a specific business unit (e.g., calls with a value of zero for both the overdue credit lines attribute and the late payments attribute may be credited to a preferred customer line). As will be appreciated, the rules can be customized according to the business needs of the business entity and/or the call handling capabilities of the call handler. At step 316, the call handler routes the call to the business unit identified by the call handler as being most appropriate based on the caller profile associated with the call. Accordingly, using the process 300, incoming calls to a business entity can be triaged, in real-time, by scoring and routing the calls based on aggregated credit data associated with the origination phone number of each call.

FIG. 4 is a block diagram of a computing device 400 housing executable software used to facilitate the call scoring and routing system 100. One or more instances of the computing device 400 may be utilized to implement any, some, or all of the components in the system 100, such as, for example, the call handler 104 and/or the scoring engine 124. Computing device 400 includes the memory element 404. Memory element 404 may include a computer readable medium for implementing the system 100, and/or components thereof, and for implementing particular system transactions. Memory element 404 may also be utilized to implement one or more databases 406, such as, for example, the credit information database 122 and/or the address information database 118. Computing device 400 also contains executable software, some of which may or may not be unique to the system 100.

In some embodiments, the system 100 is implemented in software, as an executable program, and is executed by one or more special or general purpose digital computer(s), such as a mainframe computer, a personal computer (desktop, laptop or otherwise), personal digital assistant, or other handheld computing device. Therefore, computing device 400 may be representative of any computer in which the system 100 resides or partially resides.

Generally, in terms of the hardware architecture as shown in FIG. 4, computing device 400 includes the processor 402, the memory 404, and one or more input and/or output (I/O) devices 408 (or peripherals) that are communicatively coupled via a local interface 410. Local interface 410 may be one or more buses or other wired or wireless connections, as is known in the art. Local interface 410 may have additional elements, which are omitted for simplicity, such as controllers, buffers (caches), drivers, transmitters, and receivers to facilitate external communications with other like or dissimilar computing devices. Further, local interface 410 may include address, control, and/or data connections to enable internal communications among the other computer components.

Processor 402 is a hardware device for executing software, particularly software stored in the memory 404. Processor 402 can be any custom made or commercially available processor, such as, for example, a Core series or vPro processor made by Intel Corporation, or a Phenom, Athlon or Sempron processor made by Advanced Micro Devices, Inc. In the case where computing device 400 is a server, the processor may be, for example, a Xeon or Itanium processor from Intel, or an Opteron-series processor from Advanced Micro Devices, Inc. Processor 402 may also represent multiple parallel or distributed processors working in unison.

Memory 404 can include any one or a combination of volatile memory elements (e.g., random access memory (RAM, such as DRAM, SRAM, SDRAM, etc.)) and non-volatile memory elements (e.g., ROM, hard drive, flash drive, CDROM, etc.). It may incorporate electronic, magnetic, optical, and/or other types of storage media. Memory 404 can have a distributed architecture where various components are situated remote from one another, but are still accessed by processor 402. These other components may reside on devices located elsewhere on a network or in a cloud arrangement.

The software in memory 404 may include one or more separate programs. The separate programs comprise ordered listings of executable instructions for implementing logical functions. In the example of FIG. 4, the software in memory 404 may include the system 100, the process 200, and/or the process 300, in whole or in part, in accordance with the present disclosure, and a suitable operating system (O/S) 412. Examples of suitable commercially available operating systems 412 are Windows operating systems available from Microsoft Corporation, Mac OS X available from Apple Computer, Inc., a Unix operating system from AT&T, or a Unix-derivative such as BSD or Linux. The operating system 412 will depend on the type of computing device 400.

For example, if the computing device 400 is a PDA or handheld computer, the operating system 412 may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system 412 essentially controls the execution of other computer programs, such as the system 100, and provides scheduling, input-output control, file and data management, memory management, and communication control and related services.

If computing device 400 is an IBM PC compatible computer or the like, the software in memory 404 may further include a basic input output system (BIOS). The BIOS is a set of essential software routines that initialize and test hardware at startup, start operating system 412, and support the transfer of data among the hardware devices. The BIOS is stored in ROM so that the BIOS can be executed when computing device 400 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C #, Pascal, Basic, Fortran, Cobol, Perl, Java, Ada, Python, and Lua. Components of the system 100 may also be written in a proprietary language developed to interact with these known languages.

The I/O device 408 may interact, via the local interface 410, with interactive hardware 414 comprising one or more input devices 416, such as a keyboard, a mouse, a scanner, a microphone, a touch screen, a bar code reader, or an infra-red reader. The interactive hardware 414 may also include output devices such as a display 418, a printer, an audio speaker, a headphone port, or a projector. The interactive hardware 414 may also comprise devices that communicate with the inputs or outputs, such as a communications module 420 comprising one or more of a short-range transceiver (RFID, Bluetooth, etc.), a telephonic interface, a cellular communication port, a router, or other types of network communication equipment. The interactive hardware 414 may be internal to computing device 400, or may be external and connected wirelessly or via connection cable, such as through a universal serial bus port.

When computing device 400 is in operation, processor 402 is configured to execute software stored within memory 404, to communicate data to and from memory 404, and to generally control operations of computing device 400 pursuant to the software. The system 100, the process 200, and/or the process 300, and operating system 412, in whole or in part, may be read by processor 402, buffered within processor 402, and then executed.

In the context of this document, a "computer-readable medium" may be any means that can store, communicate, propagate, or transport data objects for use by or in connection with the system 100. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. Portions of the system 100, the process 200, and/or the process 300 can be embodied in any type of computer-readable medium for use by or in connection with an instruction execution system or apparatus, such as a computer.

Referring back to FIG. 1, in some embodiments, the call handler 104 and/or the address provider 112, in whole or in part, can be implemented as computer software modules stored in a memory and operating on one or more processors associated with the system 100 or components thereof. For example, a call handling module (not shown) may be configured, using computer software instructions stored in the memory 404 and executing on the processor 402, to carry out the operations of the process 300 and/or portions of the process 200 (e.g., steps 204, 206, 212, 214, 216, 220, and/or 222). In such cases, the call handling module may include the scoring engine 124 and may be in communication with, or have access to, the credit-information database 122. Likewise, in some cases, an address providing module (not shown) may be configured to carry out one or more of the operations included in the process 200 (e.g., the steps 208 and/or 210) and other operations related to providing address information for an incoming call. In such cases, the address providing module may include the matching engine 120 and may be in communication with, or have access to, the address information database 118.

For purposes of connecting to other computing devices, computing device 400 is equipped with network communication equipment and circuitry. In a preferred embodiment, the network communication equipment includes a network card such as an Ethernet card, or a wireless connection card. In a preferred network environment, each of the plurality of computing devices 400 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 400 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

The invention claimed is:

1. A system for handling a telecommunications session in real-time, the telecommunications session being initiated by a calling device and intended for a receiving network, the system comprising:
   a memory;
   a processor in communication with the memory and a communication network associated with the telecommunications session; and
   a module stored on the memory and comprising computer software instructions executable by the processor, the module configured to:
   receive the telecommunications session,
   obtain address information associated with the calling device from one or more databases,
   determine a depersonalized credit-related score for the telecommunications session based on the address information and depersonalized aggregated credit data associated with the address information,
   identify an appropriate unit of the receiving network based on the depersonalized credit-related score, and
   route the telecommunications session to the appropriate unit.

2. The system of claim 1, wherein the depersonalized aggregated credit data is a depersonalized aggregation of a plurality of individual credit-related attributes associated with the address information.

3. The system of claim 1, wherein the address information is a ZIP+4 code.

4. The system of claim 3, wherein the depersonalized aggregated credit data is retrieved from a credit information database configured to store, for each of a plurality of ZIP+4 codes, credit-related data aggregated according to the ZIP+4 code.

5. The system of claim 1, wherein the address information is obtained based on an NPA-NXX of an origination phone number associated with the calling device.

6. The system of claim 5, wherein the module is further configured to obtain the origination phone number associated with the calling device from an automatic number identification service.

7. The system of claim 6, wherein the address information is received from an address information database configured to store address information for each of a plurality of phone numbers, the plurality of phone numbers including the origination phone number associated with the calling device.

8. The system of claim 1, wherein the receiving network includes a plurality of units, and each unit is assigned to a different range of depersonalized credit-related scores, the appropriate unit being identified by comparing the assigned range to the depersonalized credit-related score for the telecommunications session.

9. A computer-implemented method for handling an incoming call, in real-time, the call being placed by a caller to an end user, the method comprising:
   receiving the incoming call;

obtaining, from an address information database, address information associated with an origination phone number for the incoming call;

retrieving, from a credit information database, depersonalized aggregated credit data that is associated with the address information;

determining a depersonalized caller profile for the incoming call based on the depersonalized aggregated credit data;

identifying an appropriate call-answering unit of the end user based on the depersonalized caller profile; and routing the incoming call to the appropriate call-answering unit.

10. The computer-implemented method of claim 9, wherein the depersonalized aggregated credit data is a depersonalized aggregation of a plurality of individual credit-related attributes associated with the address information for the origination phone number.

11. The computer-implemented method of claim 9, wherein the address information is a ZIP+4 code.

12. The computer-implemented method of claim 9, further comprising obtaining the origination phone number for the incoming call using an automatic number identification service.

13. A system for handling, in real-time, an incoming call placed by a caller to an end user, the system comprising:
at least one memory;
at least one processor in communication with the at least one memory;
a call handling module stored on the at least one memory and comprising computer software instructions executable by the processor, the call handling module configured to receive the incoming call and determine a depersonalized aggregated credit score for the incoming call that qualifies the call for at least one of a plurality of call-answering units associated with the end user; and an address providing module stored on the at least one memory and comprising computer software instructions executable by the processor, the address providing module configured to obtain address information that is associated with an origination phone number of the incoming call, wherein the call handling module is further configured to: determine the depersonalized aggregated credit score based on the address information obtained by the address providing module and depersonalized aggregated credit data associated with the address information obtained by the address providing module, and based on said score, route the incoming call to the at least one of the plurality of call-answering units.

14. The system of claim 13, further comprising a credit information database in communication with the at least one processor and configured to store the depersonalized aggregated credit data associated with the address information.

15. The system of claim 13, wherein the depersonalized aggregated credit data is a depersonalized aggregation of a plurality of individual credit-related attributes associated with the address information for the origination phone number.

16. The system of claim 13, wherein the address information is a ZIP+4 code.

17. The system of claim 13, further comprising an address information database in communication with the at least one processor and configured to store address information for each of a plurality of phone numbers, the plurality of phone numbers including the origination phone number of the incoming call, wherein the address providing module is further configured to retrieve the associated address information from the address information database.

18. The system of claim 13, wherein the call handling module is further configured to obtain the origination phone number for the incoming call using an automatic number identification service.

19. The system of claim 18, wherein the call handling module is further configured to request the address information from the address providing module upon obtaining the origination phone number.

20. The system of claim 13, wherein each of the plurality of call-answering units is assigned a different range of depersonalized aggregated credit scores, and the incoming call qualifies for the at least one of the plurality of call-answering units if the depersonalized aggregated credit score for the incoming call falls within the corresponding range.

* * * * *